United States Patent [19]
Sandrolini et al.

[11] Patent Number: 6,021,554
[45] Date of Patent: Feb. 8, 2000

[54] TOOL FOR MOTOR REDUCER ASSEMBLY MACHINES

[75] Inventors: Franco Sandrolini, Calderara Di Reno; Gabriele Ventura, Monte San Pietro, both of Italy

[73] Assignee: Bonfiglioli Riduttori S.P.A., Lippo, Italy

[21] Appl. No.: 09/084,693

[22] Filed: May 26, 1998

[30] Foreign Application Priority Data

May 26, 1997 [IT] Italy .................................. BO97A0314

[51] Int. Cl.[7] .................................................. B23P 19/04
[52] U.S. Cl. .............................................. 29/251; 29/252
[58] Field of Search ................................. 29/732, 893.1, 29/251, 252; 269/76, 287

[56] References Cited

U.S. PATENT DOCUMENTS

| | | | |
|---|---|---|---|
| 2,184,356 | 12/1939 | Lindgren | 29/251 |
| 3,317,205 | 5/1967 | Kerr | 269/76 |
| 5,495,660 | 3/1996 | Choi . | |
| 5,555,613 | 9/1996 | Schmidt et al. . | |

FOREIGN PATENT DOCUMENTS

| | | |
|---|---|---|
| 9404876 | 7/1995 | Germany . |
| 60-161040 | 8/1985 | Japan . |
| 483299 | 12/1969 | Switzerland . |

OTHER PUBLICATIONS

Patent Abstracts of Japan of JP 60–161040 of Aug. 1985.

*Primary Examiner*—Robert C. Watson
*Attorney, Agent, or Firm*—Ladas & Parry

[57] ABSTRACT

A tool fittable to a spindle of a machine for assembling motor reducers; the machine assembling a pinion onto a shaft of the motor reducer by exerting compression, force from the spindle, to force the pinion onto the shaft and form an interference fit. The tool has a tubular body with a cavity for housing the pinion; and a number of lock devices housed inside the tubular body, each having a movable stop member which projects inside the cavity and against which rests a shoulder of the pinion to directly transmit the compression exerted by the spindle to the pinion downstream from the shoulder which separates the toothed end portion of the pinion from the rest of the pinion.

9 Claims, 2 Drawing Sheets

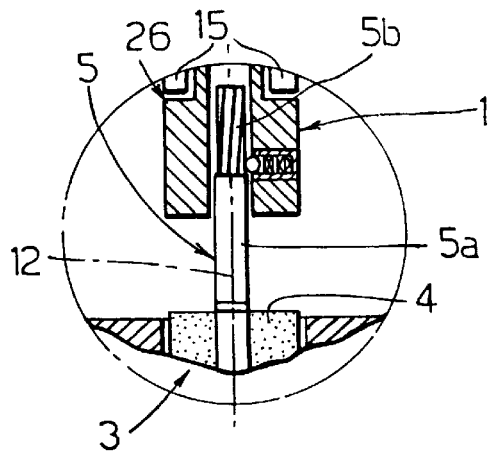
FIG. 1b
FIG. 1a
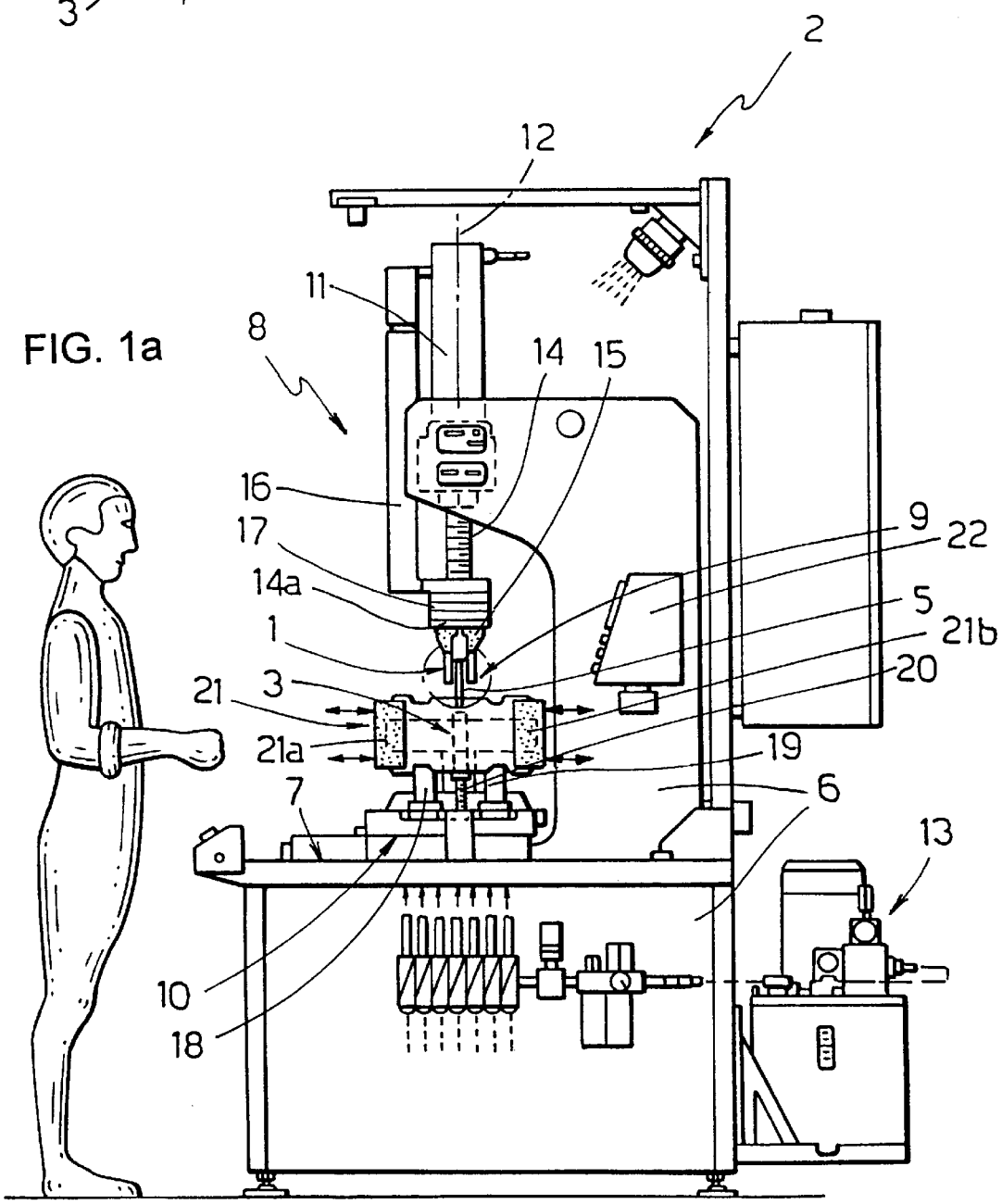

TOOL FOR MOTOR REDUCER ASSEMBLY MACHINES

BACKGROUND OF THE INVENTION

The present invention relates to a tool for motor reducer assembly machines.

For small-scale production, the current method of assembling a pinion to a motor reducer comprises positioning the motor reducer at an assembly station so that the output shaft of the motor reducer is coaxial with a reference axis; positioning a pinion coaxial with the reference axis outside the assembly station; moving the pinion axially into contact with an end portion of the output shaft of the motor reducer; and compressing the pinion onto the output shaft to form an interference fit.

To exert such compression and ensure correct fit, known assembly machines comprise a hydraulic actuator coaxial with the reference axis on the opposite side of the pinion to the motor reducer, and the rod of which is extended axially to move the pinion axially towards the motor reducer and force the pinion onto the output shaft.

When working with relatively small pinions, the compression exerted by the hydraulic actuator during assembly is often such as to partially deform the toothed portion of the pinion, thus seriously impairing the reliability of the motor reducer. That is, deformation of the toothed portion of the pinion results, in use, in severe vibration, in turn resulting in premature wear and a considerable increase in the noise level of the motor reducer.

SUMMARY OF THE INVENTION

It is an object of the present invention to provide a tool designed to prevent deformation of the toothed portion of the pinion when assembling the pinion onto the output shaft of the motor reducer.

According to the present invention, there is provided a tool for machines for assembling motor reducers; said machines assembling a pinion onto a corresponding motor reducer by exerting compression, by means of a spindle, to force said pinion onto an output shaft of said motor reducer; said pinion comprising a first end portion for fitment to said output shaft, and a toothed second end portion meshing with other gears; said pinion also comprising a shoulder separating said second end portion from the remaining portion of said pinion; and said tool being characterized by comprising a main body fitted to said spindle and having a cavity for housing at least said second end portion of the pinion; and a number of lock devices against which said shoulder is positioned to transmit said compression downstream from said second end portion of the pinion.

BRIEF DESCRIPTION OF THE DRAWINGS

A non-limiting embodiment of the present invention will be described by way of example with reference to the accompanying drawings, in which:

FIG. 1 shows a schematic view, with parts in section, of a motor reducer assembly machine featuring a tool in accordance with the teachings of the present invention;

DETAILED DESCRIPTION OF THE INVENTION

Figure 2:
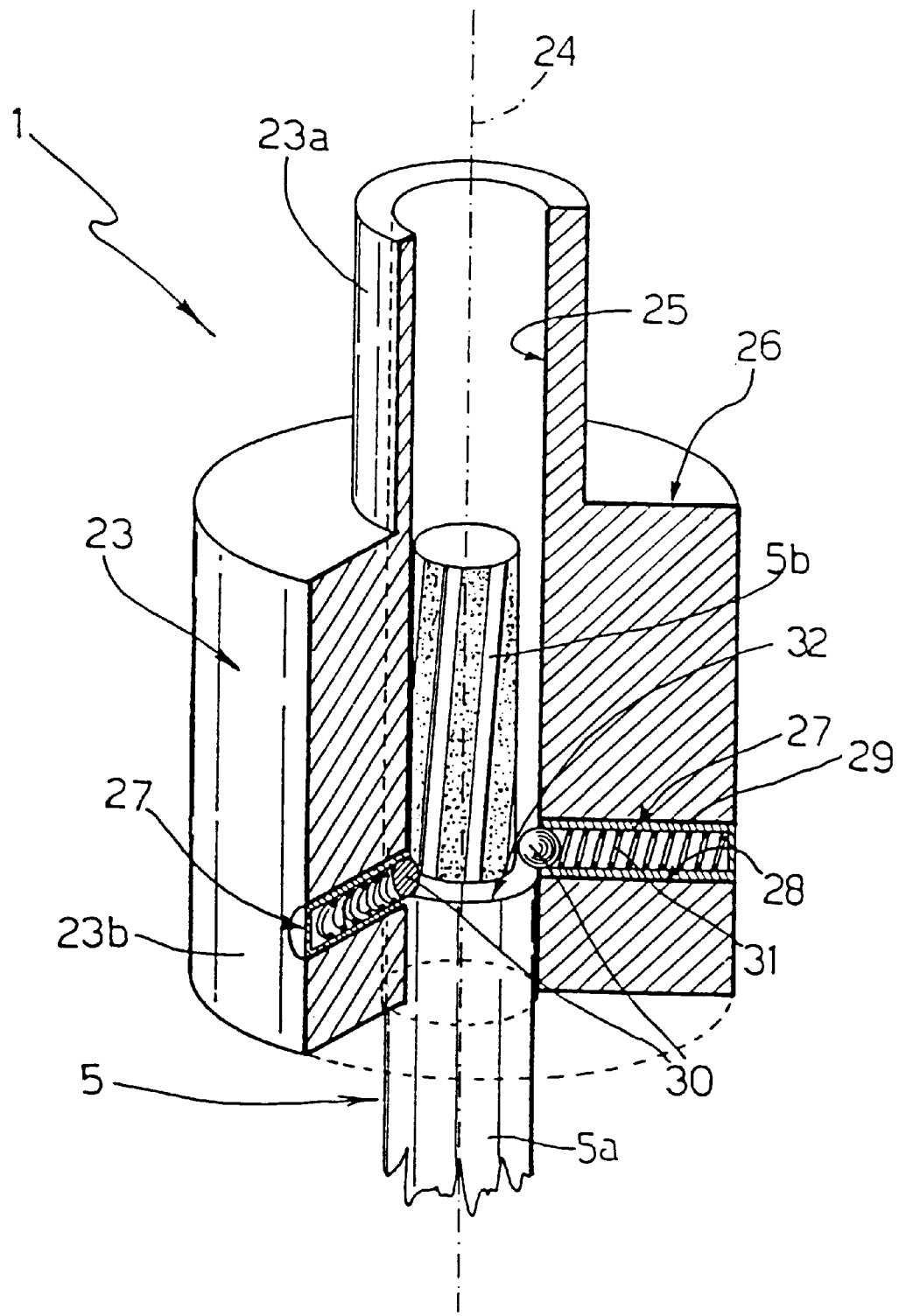
FIG. 2 shows a larger-scale view, with parts in section and parts removed for clarity, of the FIG. 1 tool.

Numeral 1 in FIGS. 1 and 2 indicates as a whole a tool for attachment to a machine 2 for assembling known motor reducers 3.

In particular, some motor reducers 3 comprise a cylindrical tubular output shaft 4, and machine 2 provides for fitting a pinion 5 onto output shaft 4 of motor reducer 3 to form an interference fit between pinion 5 and an end portion of shaft 4.

To form said interference fit, pinion 5 comprises two opposite end portions 5a and 5b; the first of which (portion 5a) is cylindrical, has a diameter approximately equal to but not less than the inside diameter of output shaft 4 of motor reducer 3, and is fitted to shaft 4; and the second of which (portion 5b) is toothed to mesh with other gears.

Machine 2, which is known, comprises a main supporting frame 6; a horizontal worktable 7 supported by frame 6; a fitting assembly 8 located above worktable 7 at an assembly station 9; and a supporting device 10 located on worktable 7 at station 9.

Fitting assembly 8 comprises a hydraulic actuator 11 located above station 9 and coaxial with a vertical reference axis 12 intersecting worktable 7 at station 9; and a pressurized-fluid supply unit 13 for selectively supplying pressurized fluid to hydraulic actuator 11, so that the rod 14 of hydraulic actuator 11 is extended towards worktable 7 and maintained coaxial with axis 12.

Fitting assembly 8 also comprises a spindle 15 fitted to a free end 14a of rod 14; and two sensors 16 and 17, the first of which serves for determining the travel of rod 14, and the second of which serves for determining the compression exerted by rod 14.

Spindle 15 either retains pinion 5 directly, or retains tool 1 in turn retaining pinion 5. In both cases, pinion 5 is maintained coaxial with axis 12, with end portion 5a facing worktable 7.

Supporting device 10 comprises a supporting frame 18 for supporting motor reducer 3 at assembly station 9 with output shaft 4 of reducer 3 coaxial with axis 12; and a stop member 19 against which the end of shaft 4 facing worktable 7 rests when motor reducer 3 is positioned at assembly station 9.

Stop member 19 provides for counteracting the compression exerted by rod 14 on shaft 4 to prevent damaging the rolling bearings on which shaft 4 rotates inside motor reducer 3, and is defined by a hydraulic actuator located coaxially with axis 12 on worktable 7, and the rod 20 of which is movable axially to and from a work position in which the free end of rod 20 contacts the end of shaft 4 facing worktable 7.

Supporting device 10 also comprises a hydraulic gripping assembly 21 in turn comprising a pair of jaws 21a and 21b located on opposite sides of motor reducer 3 at station 9. The jaws 21a and 21b, are movable to and from a gripping position to grip motor reducer 3 to frame 18 and keep shaft 4 coaxial with axis 12 when assembling pinion 5.

Machine 2 also comprises a control unit 22 for controlling hydraulic actuator 11, gripping assembly 21 and stop member 19, and which also provides, by analyzing the signals from sensors 16 and 17, for determining whether pinion 5 is fitted to shaft 4 according to predetermined assembly specifications.

With reference to FIG. 2, tool 1 comprises a cylindrical tubular body 23 extending coaxially with an axis 24, and having a through cylindrical cavity 25, which in turn extends coaxially with axis 24, has a preferably, but not necessarily, constant diameter, and houses at least portion 5b of pinion 5 to keep pinion 5 coaxial with axis 24. Cylindrical tubular body 23 also comprises an end portion 23a, which is housed inside spindle 15 so that axis 24 of tool 1 is coincident with axis 12.

In the example shown, end portion 23a has an outside diameter smaller than the remaining portion of cylindrical tubular body 23, so as to define, with the remaining portion of cylindrical tubular body 23, a shoulder 26 on which spindle 15 rests when end portion 23a is housed inside spindle 15.

Tool 1 also comprises a number of lock devices 27 equally spaced angularly in the wall of cylindrical tubular body 23, at an end portion 23b, opposite end portion 23a, of cylindrical tubular body 23. Each lock device 27 is housed inside a respective seat 28 extending radially through the wall of cylindrical tubular body 23, and comprises a hollow stud 29 engaging seat 28; a ball 30 fitted movably inside stud 29; and a spring 31 housed inside stud 29, and which provides for maintaining ball 30 in a work position in which ball 30 rests on a tapered portion of the cavity of stud 29 and projects partially inside cylindrical cavity 25.

In actual use, tool 1 is fitted to spindle 15 so that axis 24 coincides with axis 12; and end portion 5b of pinion 5 is then inserted inside cylindrical cavity 25 of tool 1 so that balls 30 of lock devices 27 rest on a shoulder 32 separating end portion 5b of pinion 5 from the remaining portion of pinion 5. In which position, the compression exerted by hydraulic actuator 11 is transmitted via lock devices 27, and more specifically by balls 30, directly downstream from end portion 5b of pinion 5, thus preventing any deformation of end portion 5b.

Tool 1 has the undisputed advantage of preventing deformation of end portion 5b of pinion 5 at very little cost and with no alterations required to the existing spindle 15.

Clearly, changes may be made to tool 1 as described and illustrated herein without, however, departing from the scope of the present invention.

What is claimed is:

1. A tool (1) for machines (2) for assembling motor reducers (3); said machines (2) assembling a pinion (5) onto a corresponding motor reducer (3) by exerting compression force by means of a spindle (15), to force said pinion (5) onto an output shaft (4) of said motor reducer (3); said pinion (5) comprising a first end portion (5a) for being engaged with said output shaft (4) with interference fit, and a toothed second end portion (5b) for meshing with other gears; said pinion (5) also comprising a shoulder (32) separating said second end portion (5b) from the remaining portion of said pinion (5); said tool (1) comprising a main body (23) fitted to said spindle (15) and having a cavity (25) for housing at least said second end portion (5b) of the pinion (5); said main body having a surface for receiving compression force from said spindle, and a number of lock devices (27) against which said shoulder (32) is positioned to transmit said compression force from said main body to said pinion via said shoulder at a location downstream from said second end portion (5b) of the pinion (5).

2. A tool as claimed in claim 1, wherein said output shaft (4) of the motor reducer (3) is coaxial with a reference axis (12); and said tool (1) comprises a first end portion (23a) which is so fitted to said spindle (15) that said cavity (25) of the main body (23) and the pinion (5) housed inside the cavity are coaxial with said reference axis.

3. A tool as claimed in claim 2, wherein said lock devices (27) are equally spaced angularly in a wall of said main body (23) at a second end portion (23b) of the main body (23) opposite said first end portion (23a) of the main body (23).

4. A tool as claimed in claim 1, wherein each of said lock devices (27) comprises a movable stop member (30) projecting inside said cavity (25) and on which rests said shoulder (32) of the pinion (5).

5. A tool as claimed in claim 4, wherein each lock device (27) is housed inside a radial seat (28) formed in said wall of the main body (23), and comprises a hollow stud (29) engaging said seat (28); a ball (30) housed inside said stud (29); and an elastic member (31) housed inside said stud (29) and for maintaining said ball (30) in a work position in which said ball (30) projects inside said cavity (25) of the main body (23); said ball (30) defining said movable stop member (30).

6. A tool as claimed in claim 1, wherein said lock devices extend radially in said main body into said cavity to bear axially against said shoulder for transmitting said compression force thereagainst.

7. A tool as claimed in claim 6, wherein said locking device is resiliently supported radially in said main body.

8. A tool as claimed in claim 7, wherein said main body has a length to receive said second end portion within said cavity without said second end portion contacting said body.

9. A tool as claimed in claim 8, wherein said pinion is insertable into said cavity of the main body, said locking devices extending into said cavity to serve as stops to engage said shoulder and limit insertion of the pinion into the cavity.

\* \* \* \* \*